United States Patent [19]

Baas et al.

[11] Patent Number: 4,809,253
[45] Date of Patent: Feb. 28, 1989

[54] FOCUS CONTROL THROUGH DETECTION OF THE RATE OF ERROR IN DISCS WITH A CONTROL SIGNAL INVERSELY DEPENDENT ON THE ERROR RATE

[75] Inventors: Dieter Baas, Kehl; Arthur Kurz, Marbach, both of Fed. Rep. of Germany

[73] Assignee: Deutsche Thomson-Brandt GmbH, Villingen-Schwenningen, Fed. Rep. of Germany

[21] Appl. No.: 925,090

[22] PCT Filed: Jan. 24, 1986

[86] PCT No.: PCT/EP86/00029
§ 371 Date: Sep. 22, 1986
§ 102(e) Date: Sep. 22, 1986

[87] PCT Pub. No.: WO86/04721
PCT Pub. Date: Aug. 14, 1986

[30] Foreign Application Priority Data
Feb. 6, 1985 [DE] Fed. Rep. of Germany ....... 3503983

[51] Int. Cl.⁴ .............................................. G11B 7/09
[52] U.S. Cl. ........................................ 369/45; 369/44; 369/54; 369/58
[58] Field of Search ................................ 369/44–46, 369/54, 58, 100, 106, 124, 53; 250/201 DF

[56] References Cited

U.S. PATENT DOCUMENTS

| | | | |
|---|---|---|---|
| 4,406,000 | 9/1983 | Shoji et al. | 369/44 |
| 4,414,655 | 11/1983 | Shoji et al. | 369/44 |
| 4,475,182 | 10/1984 | Hosaka | 369/45 |
| 4,587,644 | 5/1986 | Fujiie | 369/44 |
| 4,631,395 | 12/1986 | Ando | 250/201 DF |
| 4,700,334 | 10/1987 | Shinkai | 369/44 |
| 4,701,603 | 10/1987 | Dakin et al. | 369/45 X |

FOREIGN PATENT DOCUMENTS

| | | |
|---|---|---|
| 0093582 | 11/1983 | European Pat. Off. |
| 0095766 | 12/1983 | European Pat. Off. |
| 0117715 | 9/1984 | European Pat. Off. |
| 2134289 | 8/1984 | United Kingdom |

OTHER PUBLICATIONS

Patent Abstracts of Japan, vol. 8, No. 65, 1502 p. 263, 3/84.
Patent Abstracts of Japan, vol. 9, No. 186, 1909 p. 377, 8/85.

Primary Examiner—Alan Faber
Assistant Examiner—W. R. Young
Attorney, Agent, or Firm—Max Fogiel

[57] ABSTRACT

A focus controller for a player for rotating optically scanned information-based disks has an optical scanner with a focus actuator driven by a transformer. The loop amplification of the control circuit is controlled in accordance with a control signal that varies inversely as a function of the type and frequency of the disk errors.

4 Claims, 2 Drawing Sheets

FOCUS CONTROL THROUGH DETECTION OF THE RATE OF ERROR IN DISCS WITH A CONTROL SIGNAL INVERSELY DEPENDENT ON THE ERROR RATE

BACKGROUND OF THE INVENTION

Correcting scanning malfunctions, like dropouts, black dots, fingerprints, and scratches that occur on the surface of compact disks during playback, by means of error correction or interpolation in conjunction with the servo circuit technique to the extent that the playback is unaffectd or affected in a way that is hardly perceived by the listener is known. This is of course true only to a limited extent. It is conceivable for example that malfunctions on the order of scratches (dropouts, black dots, and fingerprints for example) on the surface of the scanned side of the disk can affect focus readjustment during scanning to the extent that an out-of-focus state can briefly occur. This means that focus will be impossible for a certain period of time due to the type, duration, and frequency of the error.

Scanning is affected to the extent that an interruption in playback will be annoyingly perceptible.

Focus readjustment must involve a closed servo circuit, specifically of a relatively high loop amplification, to ensure a powerful enough coupling between the disc and the focus activator even at the potential acceleration amplitudes that can affect the disk or scanning system. With this type and duration of error, however, high amplification and hence powerful coupling are not desirable because the coupling is too powerful for the situation.

SUMMARY OF THE INVENTION

The object of the invention is accordingly to modify the focus-control servo circuit to the extent that any type of error that occurs can be stabilized.

Further details and developments of the invention will be evident from the embodiments described in the specification herein.

The focus controls are designed in accordance with the invention in that a signal comprising a data signal and a servo signal is supplied to the output of the optical scanner. The data signal is made available for data processing. The servo signal is supplied to the control circuits. Depending on the errors in the information base, then, the focus amplification is controlled in such a way that the focus coupling will be high at a low rate of error and low at a high rate of error. Optimum data output will be attained in the means of detecting and counting determine the type, duration,and frequency of errors for specific, selected periods and, subsequent to D/A (Digital to Analog) conversion, an appropriate, constantly self-adjusting signal for controlling the amplification of the servo amplifier is generated. The invention will now be specified with reference to the drawings.

DESCRIPTION OF THE PREFERRED EMBODIMENTS

Figure 1:
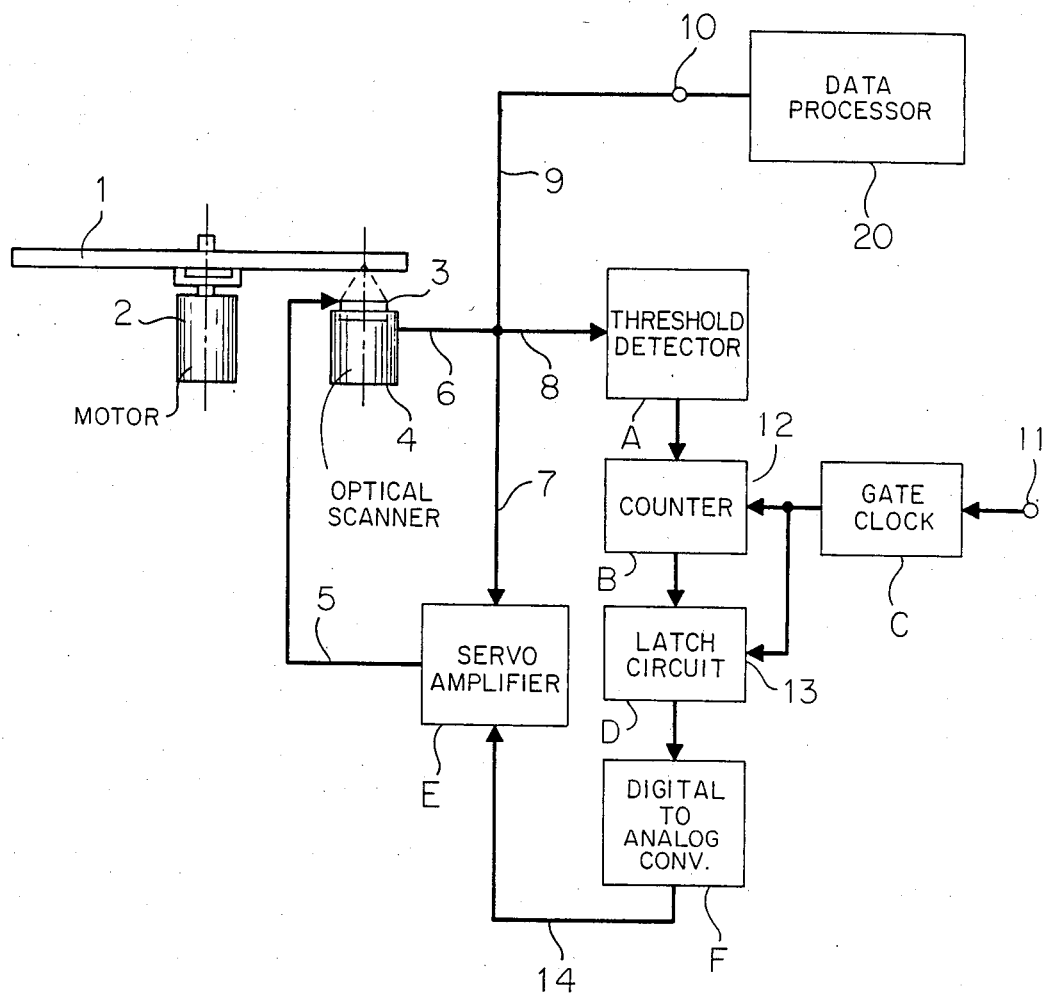
FIG. 1 is a block diagram of one embodiment of the focus controls.

FIG. 1 illustrates an information-based disk 1 that is optically scanned from below and driven by a motor 2. The optical scanner 4 has a focus actuator 3 that allows it to focus a laser beam precisely on the reflecting layer of disk 1.

During the scanning process, a composite signal, consisting of a data signal, EFM-HF (eight-to-fourteen modulation) for example, and a servo signal is supplied at the output 6 of optical scanner 4. The data signal is supplied through a line 9 to a terminal 10 to which a data-processor 20 is connected. The servo signal on the other hand is supplied through a line 8 to a threshold detector A. The output from threshold detector A leads to a counter B. Counter B is set by a gate clock C over a line 12. Gate clock C obtains pulses that represent the instantaneous speed of rotation of the disk from a terminal 11. Thus, the gate time that it emits varies depending on the instantaneous speed of rotation of the disk. The gate time is supplied through an input 13 to a latch circuit D connected to the output of counter B. Latch circuit D releases a digital signal to a downstream D/A converter F. D/A converter F releases a parameter for controlling amplification over output line 14 to a focus servo amplifier E. This constantly controls the loop amplification as a function of the type and frequency of error. Focus servo amplifier E receives the servo signal that is to be varibly amplified from a line 7 and supplies it to focus actuator 3 over a line 5. Focus actuator 3 has a transformer that, controlled by that signal, creates the desired focus by appropriately axially displacing an optical component, usually a convex lens.

Figure 2:
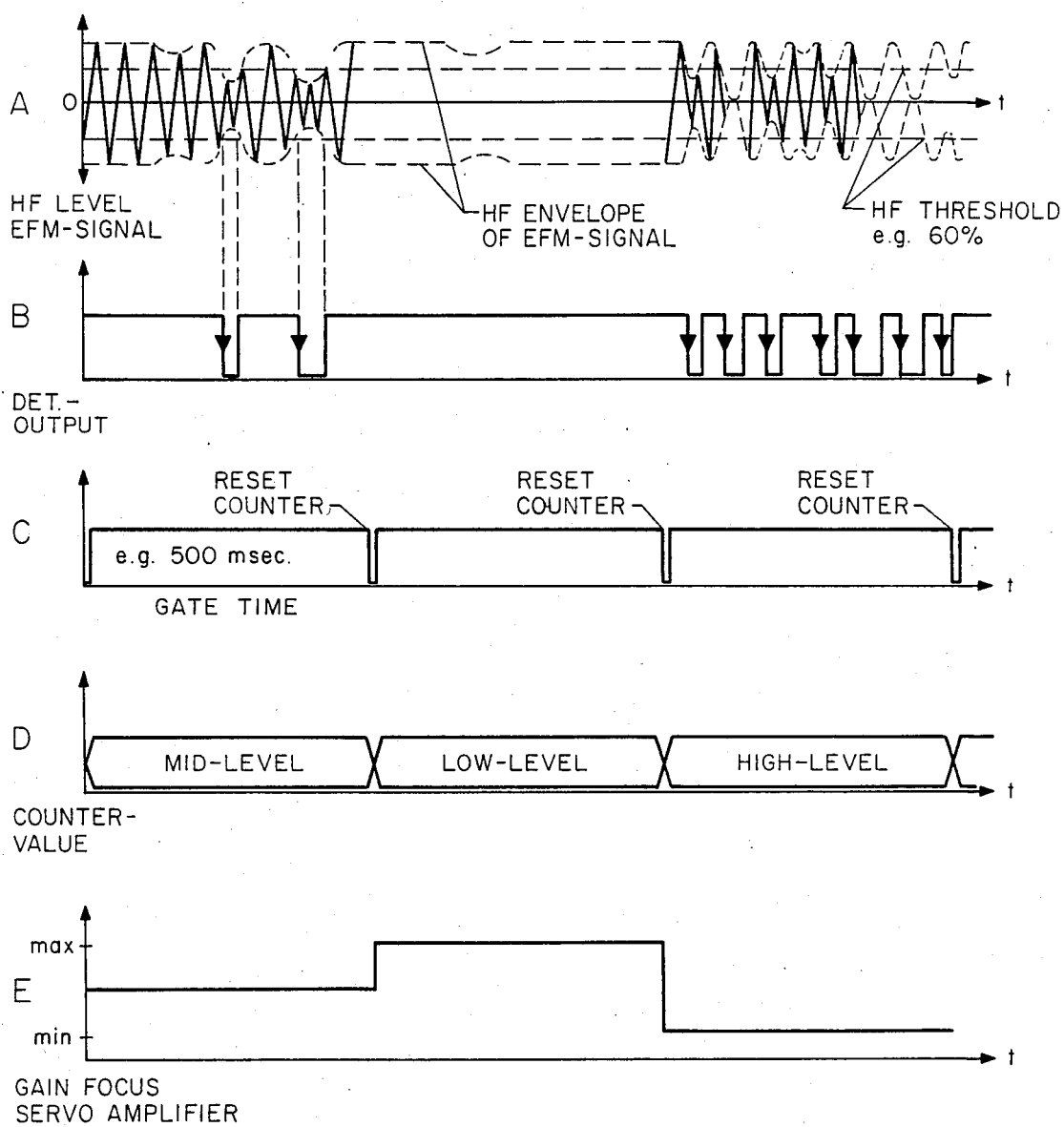
FIG. 2, consisting of A through E, is a graph of the different signals in the various stages of the circuit that controls the amplification of the focus-control circuit.

FIG. 2 illustrates how the EFM-HF signal at threshold detector A is processed into an output signal that is supplied to counter B, which, subject to gate clock C, releases an output signal that arrives at latch circuit D, is converted from digital to analog, and is supplied to focus servo amplifier E as an instantaneous parameter for amplifying it instant by instant.

The advantage of inputting a gate time that depends on the instantaneous speed of rotation is that the measuring time always corresponds to one disk revolution and hence that a new result is available at every revolution. The number of errors per result and revolution will accordingly be constant and depend on the position of the scanner on the disk (its radial distance from the center).

Instead of using a gate clock to set the counter it is also possible to provide an input that can be set to speeds of constant values. This variation of the embodiment specified herein is not illustrated in a separate block diagram because it is identical with the exception of the aforesaid difference.

A system of this type allows a practical means of controlling focus with respect not only to scanning stability in relation to disc malfunction but also to optimum coupling between the disc and the focus actuator in the case of potential acceleration amplitudes.

The aforesaid design is especially significant when compact disks begin to accumulate surface defects after frequent use.

What is claimed is:

1. A focus controller for a device for rotating information disks with errors or defects in or on a substrate of said disks that are remotely scanned, comprising: a focus actuator having a coil controlled by a focus servo amplifier; an optical scanner with output signals for controlling said coil by said servo amplifier; said focus actuator being a component of said optical scanner; said optical scanner having an output composite signal comprised of a data signal and a servo signal; a data processor receiving said data signal and control circuit means receiving said servo signal; detecting and counting means for detecting the type, duration, and frequency of errors, for counting while errors are not detected and outputting a counted value for predetermined periods; digital to analog conversion means for converting digital values from said detecting and counting means into an analog constantly self-adjusting signal to control amplification of said servo amplifier and for causing said self-adjusting signal and thus amplification and focus coupling to be high when the rate of error is low and low when the rate of error is high; said counting means being dependent on criteria of different type, duration, and frequency of errors for said predetermined periods.

2. A focus controller for a device for rotating information disks with errors or defects in or on a substrate of said disks that are remotely scanned, comprising: a focus actuator having a coil controlled by a focus servo amplifier; an optical scanner with output signals for controlling said coil by said servo amplifier; said focus actuator being a component of said optical scanner; said optical scanner having an output composite signal comprised of a data signal and a servo signal; a data processor receiving said data signal and control circuit means receiving said servo signal; detecting and counting means for detecting the type, duration, and frequency of errors, for counting while errors are not detected and outputting a counted value for predetermined periods; digital to analog conversion means connected to said detecting and counting means for converting digital values from said detecting and counting means into an analog constantly self-adjusting signal to control amplification of said servo amplifier and for causing said self-adjusting signal and thus amplification and focus coupling to be high when the rate of error is low and low when the rate of error is high; said digital to analog conversion means receiving digitally from said detecting and counting means said type, duration, and frequency of errors for predetermined periods and generating a corresponding automatic self-adjusting control signal for said servo amplifier.

3. A focus controller for a device for rotating information disks with errors or defects in or on a substrate of said disks that are remotely scanned, comprising: a focus actuator having a coil controlled by a focus servo amplifier; an optical scanner with output signals for controlling said transformer by said servo amplifier; said focus actuator being a component of said optical scanner; said optical scanner having an output composite signal comprised of a data signal and a servo signal; a data processor receiving said data signal and control circuit means receiving said servo signal; detecting and counting means for determining the type, duration, and frequency of errors for predetermined periods; digital to analog conversion means connected to said detecting and counting means for generating a constantly self-adjusting signal to control amplification of said servo amplifier and for causing said self-adjusting signal and thus amplification and focus coupling to be high when the rate of error is low and low when the rate of error is high; said servo signal being supplied to said servo amplifier; said detecting and counting means having a threshold detector with output connected to a counter, said data signal being supplied to said data processor and said threshold detector, said threshold detector output for governing said counter; a gate clock connected to said counter for setting a zeroing line for said counter, said gate having an output gating time varying dependent on the instantaneous speed of rotation of a disk, so that the predetermined period always corresponds to one disk revolution and a new result is available at every revolution at the output of said gate clock; a latch circuit with an input connected to an output of said counter, said output of said counter being connected through said latch circuit to said digital to analog conversion means, said digital to analog conversion means supplying said self-adjusting signal as a control parameter in the form of a gain signal to said servo amplifier for controlling loop amplification as a function of the rate of errors per disk revolution.

4. A focus controller for a device for rotating information disks with errors or defects in or on a substrate of said disks that are remotely scanned, comprising: a focus actuator having a coil controlled by a focus servo amplifier; an optical scanner with output signals for controlling said transformer by said servo amplifier; said focus actuator being a component of said optical scanner; said optical scanner having an output composite signal comprised of a data signal and a servo signal; a data processor receiving said data signal and control circuit means receiving said servo signal; detecting and counting means for determining the type, duration, and frequency of errors for predetermined periods; digital to analog conversion means connected to said detecting and counting means for generating a constantly self-adjusting signal to control amplification of said servo amplifier and for causing said self-adjusting signal and thus amplification and focus coupling to be high when the rate of error is low and low when the rate of error is high; said servo signal being supplied to said servo amplifier; said detecting and counting means having a threshold detector connected to a counter, said data signal being supplied to said data processor and to said threshold detector, said threshold detector for governing said counter; a latch circuit connected to an output of said counter; means for applying to a reset input of said counter a signal value representing the speed of rotation that can be adjusted to a constant value; said latch circuit having an output connected to said digital to analog conversion means, said digital to analog conversion means supplying said self-adjusting signal as a control parameter in the form of a gain signal to said servo amplifier for controlling loop amplification as a function of the rate of errors.

* * * * *